United States Patent Office 3,660,376
Patented May 2, 1972

---

3,660,376
N-ARYLIDENE ERYTHROMYCYLAMINES
Eddie H. Massey, Indianapolis, Ind., assignor to Eli Lilly and Company, Indianapolis, Ind.
No Drawing. Continuation-in-part of application Ser. No. 878,935, Nov. 21, 1969. This application Sept. 30, 1970, Ser. No. 77,049
Int. Cl. C07c 47/18
U.S. Cl. 260—210 E          4 Claims

ABSTRACT OF THE DISCLOSURE

N-arylidene derivatives of erythromycylamine and of erythromycyl B amine having improved oral activity with concomitant decrease in side effects.

CROSS-REFERENCE

This application is a continuation-in-part of application Ser. No. 878,935, filed Nov. 21, 1969 and now abandoned.

BACKGROUND OF THE INVENTION

Erythromycylamine and erythromycyl B amine have been prepared by the catalytic hydrogenation of erythromycin oxime, erythromycin B oxime or related derivatives of erythromycin or of erythromycin B (see co-pending application of Gerzon and Murphy Ser. No. 878,936, filed Nov. 21, 1969). Erythromycylamine and erythromycyl B amine both have pronounced antibiotic activity of the order of magnitude of the parent antibiotic and are effective upon either parenteral or oral administration to mice infected with Gram-positive organisms.

It is an object of this invention to provide derivatives of erythromycylamine and of erythromycyl B amine having better antibiotic activity and increased intestinal absorption when administering by the oral route.

SUMMARY

The compounds of this invention can be represented by the following formulas:

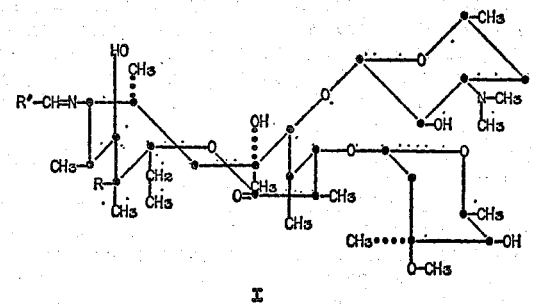

I

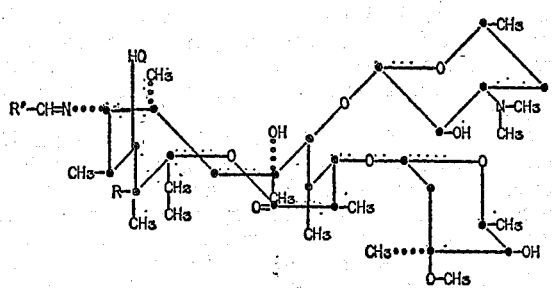

II wherein R is hydrogen or hydroxyl and R' is phenyl, naphthyl, pyridyl, substituted phenyl, substituted naphthyl, or substituted pyridyl, wherein said substituents may be one or more members of the group consisting of $C_1$–$C_3$ alkyl, halo, $C_1$–$C_3$ alkyloxy, lower alkanoyl, hydroxy, carboxy, phenyl, nitro, or trifluoromethyl. Formula I represents normal erythromycylamine or erythromycyl B amine derivatives and Formula II the corresponding epi derivatives.

In the above formulas, when R is hydrogen, the compounds are derivatives of erythromycin B and when R is hydroxyl they are derivatives of erythromycin (also sometimes designated as erythromycin A).

Throughout this specification, the generic term "N-arylidene erythromycylamines" will be understood to comprehend derivatives of both the normal and epi amines derived from erythromycin and from erythromycin B.

The groups which R' represents in the above formulas include phenyl, α- and β-naphthyl, 2-pyridyl, 3-pyridyl, and 4-pyridyl. Permissible substituents in the above rings include $C_1$–$C_3$ alkyl groups such as methyl, ethyl, n-propyl, and isopropyl; $C_1$–$C_3$ alkoxy groups, including methoxy, ethoxy, n-propoxy or isopropoxy; lower alkanoyl groups, including formyl and acetyl; or halo groups, such as chloro, bromo, fluoro, or iodo. Typical compounds coming within the scope of the above formulas include the following:

N-(4-ethylbenzylidene) epierythromycylamine
N-(2-bromobenzylidene) erythromycylamine
N-(4-isopropoxy-1-naphthylmethylene) erythromycylamine
N-(5-fluoro-2-pyridylmethylene) erythromycyl B amine
N-(3-methyl-2-pyridylmethylene) epierythromycyl B amine
N-(2-trifluoromethyl-4-pyridylmethylene) epierythromycylamine
N-(5-ethyl-3-pyridylmethylene) erythromycylamine
N-(4-methoxy-2-pyridylmethylene) erythromycyl B amine
N-[3-(n-propoxy)benzylidene] epierythromycylamine
N-(2-isopropylbenzylidene) epierythromycyl B amine
N-(2-iodobenzylidene) erythromycyl B amine
N-(1-ethoxy-2-naphthylmethylene) erythromycyl B amine
N-(5-chloro-1-naphthylmethylene) epierythromycylamine
N-(2,6-dimethyl-1-naphthylmethylene) epierythromycylamine
N-(2-phenylbenzylidene) erythromycylamine
N-(8-hydroxy-1-naphthylmethylene) erythromycylamine
N-(2-methyl-4-methoxy-1-naphthylmethylene) erythromycyl B amine
N-(2,5-dimethoxybenzylidene) erythromycylamine
N-(3,4-dichlorobenzylidene) epierythromycyl B amine
N-(2-chloro-4-methylbenzylidene) erythromycyl B amine
N-(3-methyl-5-chloro-2-pyridylmethylene) epierythromycylamine
N-(2-nitrobenzylidene) epierythromycylamine
N-(3-hydroxy-4-methoxy-2-pyridylmethylene) epierythromycyl B amine
N-(3-trifluoromethylbenzylidene) erythromycylamine
N-(4-acetylbenzylidene) erythromycylamine
N-(4-trifluoromethyl-1-naphthylmethylene) erythromycylamine
N-(5-nitro-2-naphthylmethylene) erythromycylamine
N-(5-trifluoromethyl-3-chloro-2-pyridylmethylene) epierythromycylamine
N-(5-nitro-2-pyridylmethylene) erythromycylamine The compounds of this invention have in vitro or in vivo antibiotic activity comparable or superior to that shown by erythromycin, erythromycin B, erythromycylamine or erythromycyl B amine. For example, the compounds of this invention are effective in curing infections in mammals caused by Gram-positive organisms. In order to demonstrate this activity, each member of a group of mice were injected with a culture of *S. pyogenes*. Treated mice were given two doses of the antibiotic 1 and 5 hours after infection; untreated mice were administered the pharmaceutical carrier only. Different dose levels were employed for different groups of mice in order to determine the $ED_{50}$ (dose which cures 50 percent of infected animals). Table I which follows gives the $ED_{50}$ as determined for 4 compounds coming within the scope of the above formulas. In the table, column 1 gives the name of the compound, column 2 the $ED_{50}$ by the oral route, column 3 the $ED_{50}$ by the subcutaneous route and column 4 the minimum inhibitory concentrate (MIC) in mcg./ml. determined by a routine tube assay procedure. Also included in the table are similar data for erythromycylamine for purposes of comparison.

TABLE I

| Compound | $ED_{50}$ (mg./kg.×2) b Oral | Sc | Tube MIC (mcg./ml.) |
|---|---|---|---|
| N-benzylidene-erythromycylamine | 15.6 | 3.6 | 0.2 |
| N-salicylidene-erythromycylamine | 10.4 | 2.4 | 0.6 |
| N-(1-naphthylmethylene) erythromycylamine | 28.6 | 2.6 | 0.6 |
| N-(3-hydroxy-4-methoxybenzylidene) erythromycylamine | 33.8 | 1.3 | 0.6 |
| Erythromycylamine | 26.0 | 2.6 | 0.2 |

As can be seen from the $ED_{50}$ data presented in the above table, the compounds of this invention are equal to or better than erythromycylamine in curing *S. pyogenes* infections in mice.

The increased utility of the N-arylidene erythromycylamines of this invention when administered by the oral route compared to erythromycylamine is further demonstrated by the greater antibiotic activity of the blood serum of dogs to whom the compounds have been given. In carrying out these blood-level determinations, each compound was administered by capsule to groups of 6 beagle dogs each weighing between 6 and 9 kg. The compound was administered at the rate of 25 mg./kg. and the concentration of the antibiotic in the blood determined at a series of time intervals starting at one-half hour after administration up to 6 hours. The antibiotic concentration in the blood was determined by assaying the blood sera so obtained in a standard antibiotic assay against *Sarcina lutea*. Similar studies were carried out on erythromycin and erythromycylamine for purposes of comparison. The results of these determinations are set forth in Table II which follows. In Table II, column 1 gives the name of the compound and columns 2 through 8 the blood concentrations of antibiotic activity for the particular compounds for the particular time interval indicated at the head of the column. All figures are averages of sera from six dogs.

TABLE II

Blood concentrations of antibiotic activity in dogs (oral dose, 25 mg./kg.) average for 6 dogs (mcg./kg.)

| Compound | Hours after dose | | | | | | |
|---|---|---|---|---|---|---|---|
| | 0.5 | 1 | 1.5 | 2 | 3 | 4 | 6 |
| N-benzylidene-erythromycylamine | 0.5 | 2.3 | 1.6 | 2.0 | 1.0 | 1.2 | 0.7 |
| Erythromycin | 2.4 | 2.7 | 1.2 | 0.9 | 1.2 | 0.4 | 0.2 |
| Erythromycylamine | 0.4 | 1.0 | 1.4 | 0.7 | 0.6 | 0.6 | 0.6 |

As can be seen from the above chart the blood levels with the N-benzylidene erythromycylamine are higher than those with erythromycylamine itself at every time interval tested. The peak blood levels for the compound of this invention also occurs later than with erythromycin and is considerably more prolonged.

The N-arylidene erythromycylamines are, of course, effective in vitro against both Gram-negative and Gram-positive bacteria. Table III below gives the in vitro antibiotic spectrum of two N-arylidene erythromycylamines as determined by the disc plate method using trypticase soy agar as the culture medium. In Table III, column 1 gives the name of the test organism; column 2, the minimum inhibitory concentration (MIC) in mcg./ml. at which N-benzylidene erythomycylamine inhibits the growth of the organism of column 1; column 3 similar information for N-salicylidene erythromycylamine.

TABLE III

| Organism | MIC in mcg./ml. for N-benzylidene-erythromycylamine | MIC in mcg./ml. for N-salicylidene-erythromycylamine |
|---|---|---|
| Pseudomonas sp. X-239 | 100. | 100. |
| *E. coli* EC-0127 | 6.25 | 6.25 |
| *E. coli* EC-14 | 6.25 | 6.25 |
| Proteus sp. (Indole−) PR-6 | 100. | 50. |
| Proteus sp. (Indole+) PR-9 | 100. | 100. |
| K. aerobacter K-1 | 12.5 | 12.5 |
| K. aerobacter KA-14 | 6.25 | 6.25 |
| *S. aureus* PS-3055 | .2 | .1 |
| *S. aureus* MR-3130 | 6.25 | 6.25 |
| *S. typhimurium* S-4 | 6.25 | 6.25 |
| *S. typhosa* T-36 | 6.25 | 6.25 |
| Salmonella sp. SA-12 | 6.25 | 6.25 |
| Shigella sp. SH-3 | 6.25 | 3.13 |

As can be seen from Tables I–III, the N-arylidene erythromycylamines have antibiotic activity against both Gram-positive and Gram-negative organisms, both in vitro and in vivo. Thus, the compounds can be used to control the population of staphylococci or streptococci present on equipment, furnishings, walls and floors in dental and medical offices and in hospitals. For such use the N-arylidene erythromycylamine is dissolved in water, preferably with the addition of a surface active agent, and the solution applied to the surfaces as an ordinary wash solution. The N-arylidene erythromycylamines can also be used for treating infections in mammals and birds caused by various microorganisms; and, when so used, the methods employed for the administration of erythromycin, its salts or its derivatives to both animals and man can be adapted directly for the use of the N-arylidene erythromycylamines; that is to say, the N-arylidene erythromycylamines can be used to treat infections caused by pathogenic microorganisms such as the staphylococci, pneumococci, streptococci (including hemolytic streptococci) and also strains of Neisseria, Hemphilus, Corynebacterium, Brucella and Clostridium. When employed to treat infections in mammals or birds, the N-arylidene erythromycylamines are administered in dosages ranging from 0.5 to 2 g. per day in divided dosages.

The N-arylidene erythromycylamines are administered to mammals usually by the oral route either in the form of capsules or tablets, either of which pharmaceutical forms can be prepared by the methods used to prepare similar pharmaceutical forms for erythromycin itself.

Another advantage, in addition to their increased oral activity, to be gained in employing the N-arylidene erythromycylamines in therapy lies, not only in the fact that they are virtually devoid of any tendency to induce abnormal liver function, as can happen with erythromycin itself, but also in the fact that they cause little or no increase in intestinal motility as compared with erythromycin or its salts.

The lessened degree of intestinal motility of the N-arylidene erythromycylamines, as compared with erythromycin, is illustrated by the following experiment, in which erythromycin and N-arylidene erythromycylamines were administered to dogs with permanently implanted induction coils on the walls of the gut. The antibiotic was administered in each instance orally to the dogs at a dose level of 25 mg./kg. and the number of dogs vomiting determined. The results of the experiment are given in Table IV. In Table IV, column 1 gives the name of the compound, column 2 gives the number of dogs used and column 3 gives the number of dogs vomiting.

TABLE IV

| Compound | Number of dogs | Number of dogs vomiting |
|---|---|---|
| N-benzylidene erythromycylamine | 6 | 0 |
| N-salicylidene erythromycylamine | 6 | 0 |
| Erythromycin | 6 | 3 |

To summarize the antibiotic activity of the N-arylidene erythromycylamines of this invention, the compounds have an in vitro activity equivalent to that of erythromycylamine or of erythromycin. When used in vivo, they are less stimulating to the gastro-intestinal tract than is erythromycin, and show no evidence of liver toxicity. The compounds have a better oral activity against infections in mice than does erythromycylamine. In terms of blood levels in fasted dogs, the N-arylidene erythromycylamines give a higher and more prolonged blood-level than either erythromycylamine or erythromycin.

The preparation of the compounds of this invention is illustrated by the following specific examples:

Example 1.—N-benzylidene erythromycylamine

About 1.5 g. of benzaldehyde were added to a hot solution of 10.0 g. of erythromycylamine in 50 ml. of isopropanol. The reaction mixture was heated to boiling for about 1.5 hours. Water was then added until crystallization of N-benzylidene erythromycylamine, formed in the above reaction, was initiated. The reaction mixture was cooled and N-benzylidene erythromycylamine separated by filtration. M.P.=142-146° C.

Analysis.—Calcd. (percent): C, 62.9; H, 8.9; N, 3.2. Found (percent): C, 62.97; H, 9.04; N, 3.20.

The following compounds were prepared according to the above procedure by reacting the appropriate aldehyde with erythromycylamine:

romycylamine are prepared by the procedures of Example 1 or Example 2 above.

Erythromycylamine and erythromycyl B amine are prepared by the catalytic hydrogenation of erythromycin oxime, erythromycin B oxime or similar derivatives (see co-pending application of Gerzon and Murphy, Ser. No. 878,936, filed Nov. 21, 1969).

Epierythromycyl amine itself is isolated from the reduction mixture obtained when erythromycin oxime, erythromycin hydrazine adduct or similar derivatives are hydrogenated catalytically. Epierythromycyl B amine is likewise produced along with erythromycyl B amine when erythromycin B oxime is hydrogenated and also be isolated from the hydrogenation mixture (see co-pending application of Massey and Kitchell, Ser. No. 878,937, filed Nov. 21, 1969).

I claim:
1. A compound of the following formulas:

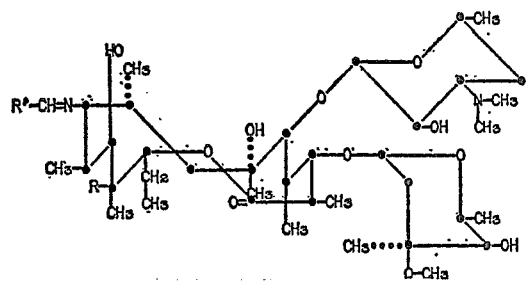

| Compound | M.P. | Analysis | | | | | |
|---|---|---|---|---|---|---|---|
| | | C | | H | | N | |
| | | Calc. | Found | Calc. | Found | Calc. | Found |
| N-salicylidene erythromycylamine | 124-26° C | 63.05 | 63.00 | 8.78 | 8.85 | 3.34 | 2.74 |
| N-4-methylbenzylidene erythromycylamine | 141-43° C | 64.56 | 64.35 | 9.15 | 9.30 | 3.35 | 3.25 |
| N-4-carboxybenzylidene erythromycylamine | 212-15° C | 62.40 | 62.19 | 8.50 | 8.34 | 3.24 | 3.41 |
| N-4-methoxybenzylidene erythromycylamine | Amorphous | 63.35 | 63.14 | 8.98 | 8.89 | 3.28 | 3.28 |
| N-(3-pyridylmethylene) erythromycylamine | Amorphous | 62.59 | 62.31 | 9.04 | 8.76 | 5.09 | 5.04 |
| N-4-chlorobenzylidene erythromycylamine | Amorphous | 61.63 | 61.46 | 8.58 | 8.61 | 3.27 | 3.24 |
| N-3-hydroxy-4-methoxybenzylidene erythromycylamine | 144-46° C | 62.19 | 62.42 | 8.82 | 8.61 | 3.22 | 3.31 |
| N-4-phenyl-benzylidene erythromycylamine | Amorphous | 66.78 | 66.50 | 8.74 | 8.85 | 3.11 | 3.34 |
| N-4-bromobenzylidene erythromycylamine | 142-150° C | 58.58 | 58.30 | 8.15 | 8.33 | 3.10 | 3.12 |
| N-4-nitrobenzylidene erythromycylamine | 151-162° C | 60.87 | 60.89 | 8.47 | 8.66 | 4.84 | 4.64 |
| N-4-formylbenzylidene erythromycylamine* | Amorphous | 63.50 | 63.27 | 8.76 | 8.57 | 3.29 | 3.34 |
| N-2,4,6-trimethoxybenzylidene erythromycylamine | 202.5-204° C | 61.81 | 61.70 | 8.83 | 8.56 | 3.06 | 3.02 |
| N-2,4,6-trimethylbenzylidene erythromycylamine | 136.5-140° C | 65.24 | 65.38 | 9.31 | 9.40 | 3.23 | 3.20 |
| N-2-methoxybenzylidene erythromycylamine | 134-138° C | 63.30 | 63.50 | 9.00 | 9.00 | 3.30 | 3.10 |
| N-2,4-dimethoxybenzylidene erythromycylamine | Amorphous | 62.50 | 62.30 | 8.90 | 9.10 | 3.10 | 3.10 |
| N-(2-pyridylmethylene) erythromycylamine | 146-156° C | 62.80 | 62.90 | 8.80 | 9.10 | 5.10 | 4.80 |
| N-(4-pyridylmethylene) erythromycylamine | 160-163° C | 62.80 | 62.90 | 8.80 | 9.10 | 5.10 | 5.10 |

*In preparing this derivative, the procedure of the above example is preferably modified to employ equimolar quantities of amine and aldehyde.

Example 2.—N-(1-naphthylmethylene) erythromycylamine

Following the procedure of Example 1, α-naphthylaldehyde and erythromycylamine were reacted in isopropanol solution to yield N-(1-naphthylmethylene) erythromycylamine. The compound was isolated by diluting the reaction mixture with water and extracting the aqueous solution with methylene chloride. Evaporation of the separated methylene chloride extracts yielded N-(1-naphthylmethylene) erythromycylamine as a residue. The compound was crystallized from a methanol-water solvent mixture. M.P.=140-146° C.

Analysis.—Calcd. (percent): C, 66.10; H, 8.67; N, 3.21. Found (percent): C, 65.83; H, 8.41; N, 3.45.

The N-benzylidene, N-salicylidene, and similar Schiff-base derivatives of erythromycyl B amine or of epierythromycylamine and

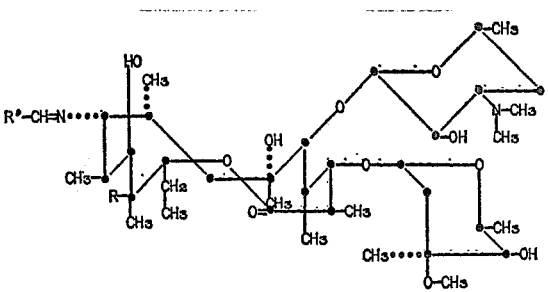

wherein R is hydrogen or hydroxyl and R' is phenyl, naphthyl, pyridyl, substituted phenyl, substituted naphthyl, or substituted pyridyl, wherein said substituents may be one or more members of the group consisting of $C_1$–$C_3$ alkyl, halo, $C_1$–$C_3$ alkyloxy, lower alkanoyl, hydroxy, carboxy, phenyl, nitro, or trifluoromethyl.

2. A compound according to claim 1, said compound being N-benzylidene erythromycylamine.

3. A compound according to claim 1, said compound being N-salicylidene erythromycylamine.

4. A compound according to claim 1, said compound being N-4-formylbenzylidene erythromycylamine.

References Cited

UNITED STATES PATENTS 3,478,014　11/1969　Djokic et al. _____ 260—210 E
3,538,076　11/1970　Tamburasev et al. __ 260—210 E LEWIS GOTTS, Primary Examiner J. R. BROWN, Assistant Examiner U.S. Cl. X.R.

424—180